United States Patent
Furukawa et al.

(10) Patent No.: US 7,545,719 B2
(45) Date of Patent: Jun. 9, 2009

(54) OPTICAL DISK APPARATUS CAPABLE OF MEASURING AND RECORDING SIGNAL CONDITION, AND METHOD THEREOF

(75) Inventors: Kenichi Furukawa, Atsugi (JP); Masao Fukaya, Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 455 days.

(21) Appl. No.: 10/715,623

(22) Filed: Nov. 18, 2003

(65) Prior Publication Data
US 2004/0240354 A1    Dec. 2, 2004

(30) Foreign Application Priority Data
Dec. 24, 2002    (JP) .............................. 2002-372425

(51) Int. Cl.
*G11B 7/00*    (2006.01)
(52) U.S. Cl. .................. 369/53.13; 369/53.31; 369/116
(58) Field of Classification Search .................. None
See application file for complete search history.

(56) References Cited

U.S. PATENT DOCUMENTS 6,052,347 A * 4/2000 Miyata .................. 369/47.53
6,987,717 B2 * 1/2006 Hagiwara et al. ........ 369/47.53
2001/0003519 A1 6/2001 Tsukihashi
2002/0064110 A1 5/2002 Sato
2002/0136121 A1 9/2002 Salmonsen et al.
2002/0141308 A1 10/2002 Matsumoto
2002/0150012 A1 10/2002 Hsiao et al.

FOREIGN PATENT DOCUMENTS

EP    1 244 097    9/2002
JP    2002-298356    10/2002

* cited by examiner

*Primary Examiner*—Joseph Feild
*Assistant Examiner*—Joseph Haley
(74) *Attorney, Agent, or Firm*—Ladas & Parry LLP

(57) ABSTRACT

An optical disk apparatus is capable of recording a signal on an optical disk by directing an optical beam thereon at a plurality of recording speeds. A condition measuring position storing part stores one or more condition measuring positions at which a condition of the signal is measured for each of the recording speeds. A signal condition measuring part measures the condition of the signal by suspending recording operations at the condition measuring positions stored in the condition measuring position storing part. In the condition measuring position storing part, a condition measuring position for a recording speed whose level is one level lower than the level of a predetermined recording speed are set to positions shifted for a predetermined time interval from respective condition measuring positions for the predetermined recording speed.

6 Claims, 11 Drawing Sheets

FIG.4

|  | 48-SPEED | 42-SPEED | 36-SPEED |
|---|---|---|---|
| ABSOLUTE TIME (MIN) | 8 | 1 0 | 1 2 |
| | 2 4 | 2 6 | 2 8 |
| | 3 6 | 3 8 | 4 0 |
| | 4 8 | 5 0 | 5 2 |
| | 6 4 | 6 6 | 6 8 |

OPTICAL DISK APPARATUS CAPABLE OF MEASURING AND RECORDING SIGNAL CONDITION, AND METHOD THEREOF

BACKGROUND OF THE INVENTION

1. Field of the Invention

The present invention generally relates to optical disk apparatuses, condition measuring methods, and condition measuring position setting methods, and more particularly, to an optical disk apparatus capable of recording a signal on an optical disk at a plurality of recording speeds, a condition measuring method, and a condition measuring position setting method.

2. Description of the Related Art

CD-Rs (compact disks-recordable) and CD-RWs (compact disks-rewritable) have respective different optimum recording powers of lasers depending on the manufacturing companies. Hence, in optical disk apparatuses for recording information on CD-Rs and CD-RWs, when a disk is loaded and a recording instruction is given, OPC (optimum power control) processing is performed. The OPC processing is for determining an optimum recording laser power and is performed by using a PCA (power calibration area) that is set in the inner tracks of an optical disk.

A description will be given of the OPC processing.

In the OPC processing, first, a predetermined signal is recorded on the PCA at a predetermined recording speed while varying the recording power of a laser in 15 stages. Next, the signal recorded on the PCA is reproduced, and 15β values are obtained from the peak values and the bottom values of a reproduced signal S1.

FIG. 1 is a graph for explaining a measuring method of the β value. In FIG. 1, V0 represents a fiducial value 0.

The β value can be obtained based on the following equation (1) where the peak value of the reproduced signal S1 is A1 and the bottom value thereof is A2.

$$\beta = (A1+A2)/(A1-A2) \qquad (1)$$

FIG. 2 is a graph for explaining the relationship between the recording power and the β value. In FIG. 2, the vertical axis represents the β value (β), and the horizontal axis represents the recording power (pw).

As shown in FIG. 2, the β value varies generally according to a quadratic function. A recording power pw0 at which the β value becomes the minimum is the optimum recording power.

Accordingly, the recording power pw0 at which the minimum β value is obtained among the 15 β values that are obtained based on the above equation (1) is set to the optimum recording power at the predetermined recording speed.

The optimum recording power at each recording speed is obtained by performing the above-mentioned operation for each recording speed. The obtained optimum recording powers for respective recording speeds are set to a register of a microcomputer and used when recording a signal (refer to Japanese Laid-Open Patent Application No. 2002-298356, for example).

In conventional optical disk apparatuses, the recording power has been set based on the optimum recording power that is set in the above-mentioned OPC processing, and the radius of the position on the optical disk has not been considered. Thus, there are problems in that the recording power cannot be set with accuracy, for example.

SUMMARY OF THE INVENTION

It is a general object of the present invention to provide an improved and useful optical disk apparatus, condition measuring method, and condition measuring position setting method in which one or more of the above-mentioned problems are eliminated.

It is another and more specific object of the present invention to provide an optical disk apparatus capable of measuring the characteristics of an optical disk with accuracy, a condition measuring method, and a condition measuring position setting method.

In order to achieve the above-mentioned objects, according to one aspect of the present invention, there is provided an optical disk apparatus capable of recording a signal on an optical disk by directing an optical beam thereon at a plurality of recording speeds, the apparatus including:

a condition measuring position storing part that stores one or more condition measuring positions at which a condition of the signal is measured for each of the recording speeds; and a signal condition measuring part that measures the condition of the signal by suspending a recording operation at the condition measuring positions stored in the condition measuring position storing part, wherein, in the condition measuring position storing part, the condition measuring positions for a recording speed whose level is one level lower than the level of a predetermined recording speed are set to positions shifted for a predetermined time from respective condition measuring positions for the predetermined recording speed.

Additionally, according to another aspect of the present invention, there is also provided a condition measuring method of measuring a condition of a signal recorded on an optical disk by an optical disk apparatus capable of recording the signal on the optical disk by directing an optical beam thereon at a plurality of recording speeds, the method including the steps of:

setting second condition measuring positions for a second recording speed whose level is one level lower than the level of a predetermined recording speed to positions that are shifted for a predetermined time from first condition measuring positions for the predetermined recording speed; and measuring the condition of the signal by suspending a recording operation at the first and second condition measuring positions at the predetermined recording speed and the second recording speed, respectively.

Further, according to another aspect of the present invention, there is also provided a condition measuring position setting method of setting a condition measuring position at which a condition of a signal recorded on an optical disk is measured by an optical disk apparatus capable of recording the signal on the optical disk by focusing an optical beam thereon at a plurality of recording speeds, the method including the steps of:

arbitrarily setting first condition measuring positions for a maximum recording speed;

setting second condition measuring positions for a second recording speed whose level is one level lower than the level of the maximum recording speed to positions that are shifted for a predetermined time from the respective first condition measuring positions; and when setting third condition measuring positions for a third recording speed whose level is lower than the level of the second recording speed, setting the third condition measuring positions to positions that are shifted for the predetermined time from respective measuring positions of a recording speed whose level is one level higher than the third recording speed.

According to the present invention, condition measuring positions for a recording speed are set to such positions that are shifted (delayed) for a predetermined time from respective condition measuring positions that are set for a one level higher recording speed. Thereby, when the recording speed is reduced based on a condition measuring result at a condition measuring position for the one level higher recording speed, it is possible to correct the recording power by immediately and accurately performing condition measuring at the reduced recording speed. Accordingly, it is possible to perform the recording operation with accuracy.

Other objects, features and advantages of the present invention will become more apparent from the following detailed description when read in conjunction with the following drawings.

BRIEF DESCRIPTION OF THE DRAWINGS

FIG. 4 shows a WPC position table;

DETAILED DESCRIPTION OF THE PREFERRED EMBODIMENTS

Figure 1:
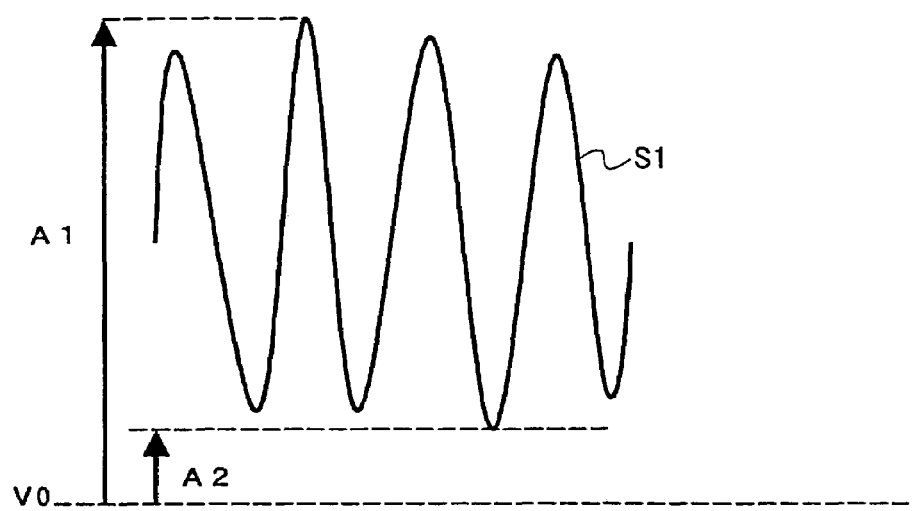
FIG. 1 is a graph for explaining an operation of measuring β.
Figure 2:
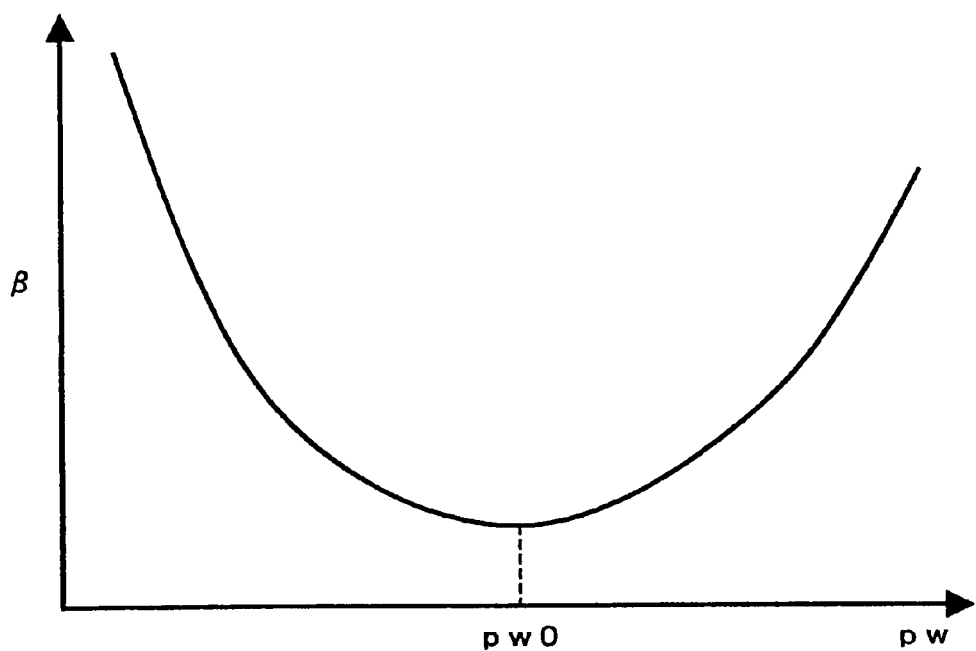
FIG. 2 is a graph showing the relationship between the recording power (pw) and the β value (β)
Figure 3:
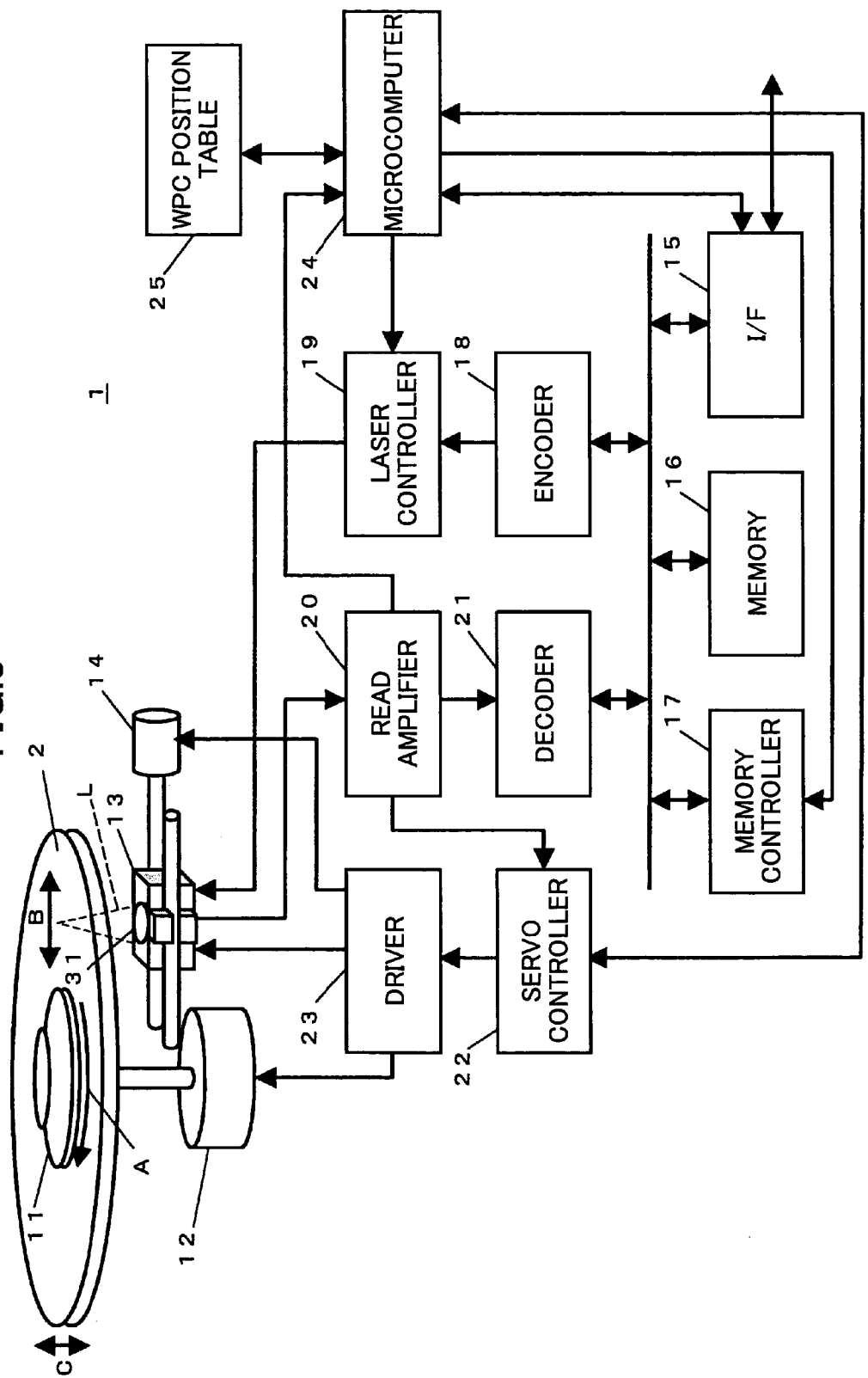
FIG. 3 is a block diagram of an optical disk apparatus according to one embodiment of the present invention.

FIG. 3 is a block diagram of an optical disk apparatus 1 according to one embodiment of the present invention.

The optical disk apparatus 1 according to this embodiment is a drive capable of recording information on and/or reproducing information from a CD-R and a CD-RW, for example. The optical disk apparatus 1 includes a turntable 11, a spindle motor 12, an optical pickup 13, a thread motor 14, an interface (I/F) 15, a memory 16, a memory controller 17, an encoder 18, a laser controller 19, a read amplifier 20, a decoder 21, a servo controller 22, a driver 23, a microcomputer 24, and a WPC position table 25.

It should be noted that WPC (write power compensation) refers to a function of interrupting recording at a predetermined position, verifying a recording condition, and correcting the recording power or reducing the recording speed in accordance with the status of the verified recording condition.

An optical disk 2 is mounted on the turntable 11. The turntable 11 is rotated by the spindle motor 12 and rotates the optical disk 2 in the direction indicated by an arrow A in FIG. 3, for example. The spindle motor 12 is rotated in accordance with a drive signal from the driver 23.

The optical pickup 13 is arranged to face the optical disk 2 and directs an optical beam L by converging the optical beam L through an objective lens 31. The optical pickup 13 incorporates a tracking actuator (not shown) that performs tracking control by oscillating the objective lens 31 in the directions indicated by arrows B in FIG. 3 and a focus actuator (not shown) that performs focus control by oscillating the objective lens 31 in the directions indicated by arrows C in FIG. 3. The tracking actuator and the focus actuator are driven by drive signals from the driver 23.

In accordance with a control signal from the servo controller 22, the driver 23 supplies the drive signals to the spindle motor 12, the thread motor 14, the tracking actuator, and the focus actuator. The thread motor 14 is a motor for moving the optical pickup 13 in the radius directions of the optical disk 2, that is, the directions indicated by the arrows B.

The servo controller 22 generates and supplies to the driver 23 control signals for controlling the tracking actuator, the focus actuator, and the thread motor 14 based on a tracking error signal and a focus error signal that are supplied from the read amplifier 20. Also, based on an instruction from the microcomputer 24, the servo controller 22 controls rotation of the spindle motor 12 and controls the tracking actuator, the focus actuator, and the thread motor 14 via the driver 23. The servo controller controls, for example, the rotational speed of the spindle motor 12 in accordance with a recording speed instruction from the microcomputer 24. The tracking actuator and the thread motor 14 are driven based on an instruction from the microcomputer 24, thereby performing a seek operation.

The optical pickup 13 further incorporates a photodetector (not shown). The photodetector detects and supplies to the read amplifier 20 a focus error signal, a tracking error signal, and a recording signal. The read amplifier 20 amplifies and supplies to the servo controller 22 the focus error signal and the tracking error signal. The read amplifier 20 amplifies and supplies the recording signal to the decoder 21 and the microcomputer 24.

The decoder 21 decodes the recording signal from the read amplifier 20. Data decoded by the decoder 21 are temporarily stored in the memory 16 by the memory controller 17. The data stored in the memory 16 are supplied to a host computer via the interface 15 that interfaces with the host computer. The memory 16 is constituted by a RAM (random access memory) and used as a buffer memory. The memory controller 17 controls communications among the interface 15, the memory 16, the encoder 18, and the decoder 21.

Recording data from the host computer are temporarily stored in the memory 16 via the interface 15, and then supplied to the encoder 18. The encoder 18 encodes the recording data and generates a recording signal. The recording signal generated by the encoder 18 is supplied to the laser controller 19. The laser controller 19 drives a laser diode (not shown) incorporated in the optical pickup 13.

The laser diode emits light in accordance with a drive signal supplied from the laser controller 19. The light emitted from the laser diode is converged by the objective lens 31 and directed to the optical disk 2.

At the time of recording, the laser controller 19 generates the drive signal based on the recording signal from the encoder 18 and causes the laser diode incorporated in the optical pickup 13 to emit light. The light intensity of the laser diode is increased when the level of the recording signal supplied from the laser controller 19 is high, and is decreased when the level of the recording signal is low, for example.

When the light intensity of the laser diode is high, the heat forms a pit on the optical disk 2. When the light intensity of the laser diode is low, a pit is not formed. With these operations, pits corresponding to the recording signal are formed on the optical disk 2. At the time of reproducing, the laser controller 19 controls the laser diode to emit on the optical disk 2 at a constant intensity a light having an intensity that does not form a pit thereon.

At the time of recording, the laser controller 19 is capable of controlling the amplitude of the light emitted from the laser diode based on an instruction from the microcomputer 24. When an instruction to increase the amplitude of the light is received from the microcomputer 24, for example, the laser controller 19 increases the intensity of the light emitted from the laser diode by increasing the amplitude of the drive signal supplied to the laser diode. When an instruction to decrease the amplitude of the light is received from the microcomputer 24, the laser controller 19 decreases the amplitude of the light emitted from the laser diode by decreasing the amplitude of the drive signal supplied to the laser diode. The microcomputer 24 controls the amplitude of the light based on results of the OPC processing and the WPC processing, for example.

The WPC position table 25 stores positions at which the WPC processing is performed for each recording speed.

FIG. 4 shows data of the WPC position table 25.

As shown in FIG. 4, the WPC position table 25 represents the WPC position by absolute time (min). When the maximum recording speed is 48-speed, first, setting is made such that WPC is performed at the positions of 8 minutes, 24 minutes, 36 minutes, 48 minutes, and 64 minutes in the absolute time on the optical disk 2. On this occasion, the WPC positions at the maximum recording speed, i.e., 48-speed, are set arbitrarily.

If a recording speed whose level is one level lower than the level of 48-speed, i.e., the recording speed that is slowed down by one step (level) from 48-speed, is 42-speed, then the WPC positions for the recording speed of 42-speed are set to such positions that are shifted (delayed) from the WPC positions for the recording speed of 48-speed, which is a one level higher recording speed, for a predetermined time interval in absolute time, for example, two minutes. Two minutes in absolute time corresponds to four seconds at the recording speed of 32-speed. By performing the WPC processing after two minutes have elapsed in absolute time, it is possible to perform the WPC processing stably and quickly. Accordingly, the WPC positions at the recording speed of 42-speed are the positions of 10 minutes, 26 minutes, 38 minutes, 50 minutes, and 66 minutes.

If a recording speed whose level is one level lower than the level of 42-speed, i.e., the recording speed that is slowed down by one step (level) from 42-speed, is 36-speed, then the WPC positions for the recording speed of 36-speed are set to such positions that are shifted (delayed) from the WPC positions for the recording speed of 42-speed, which is a one level higher recording speed, for a predetermined time in absolute time, for example, two minutes. Accordingly, the WPC positions at the recording speed of 36-speed are the positions of 12 minutes, 28 minutes, 40 minutes, 52 minutes, and 68 minutes in absolute time.

In this embodiment, for simplicity of explanation, the description is given of the cases of 48-speed, 42-speed, and 36-speed as examples. The condition measuring positions at other speeds are also set in a similar manner. That is, the condition measuring positions (WPC positions) are set arbitrarily for the maximum recording speed. The condition measuring positions for a second recording speed whose level is one level lower than the level of the maximum recording speed are set to such positions that are shifted (delayed) for a predetermined time $\Delta T$ from the respective condition measuring positions that are set for the maximum recording speed. Sequentially, the condition measuring positions for a third recording speed whose level is one level lower than the second recording speed are set to such positions that are shifted (delayed) for the predetermined time $\Delta T$ from the conditions measuring positions that are set for the second recording speed.

In this embodiment, the predetermined time $\Delta T$ is set to two minutes. This is not a limitation, however, and the predetermined time $\Delta T$ may be varied for each recording speed.

Figure 5:
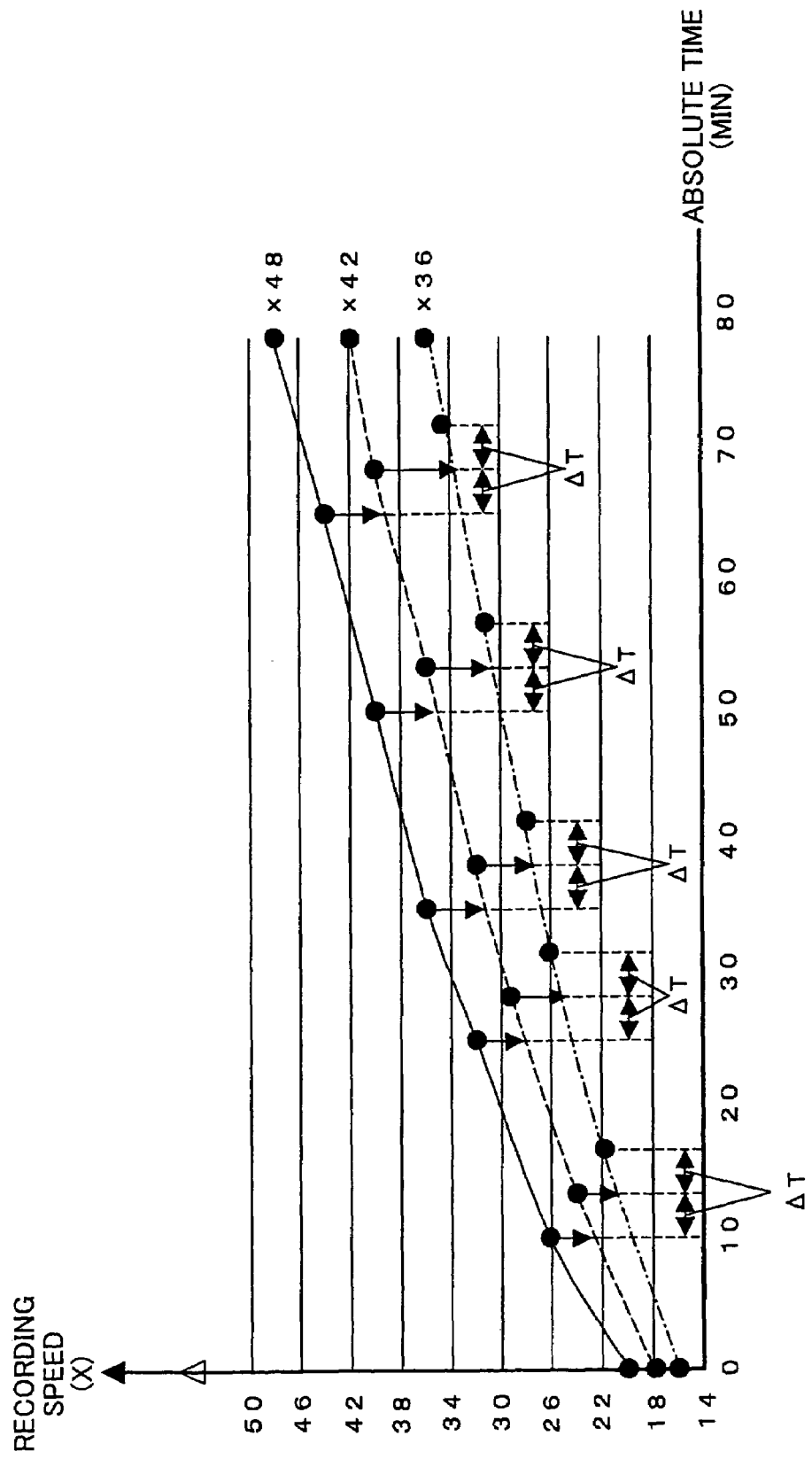
FIG. 5 is a graph showing variations of the recording speed with respect to absolute time on an optical disk.
Figure 6:
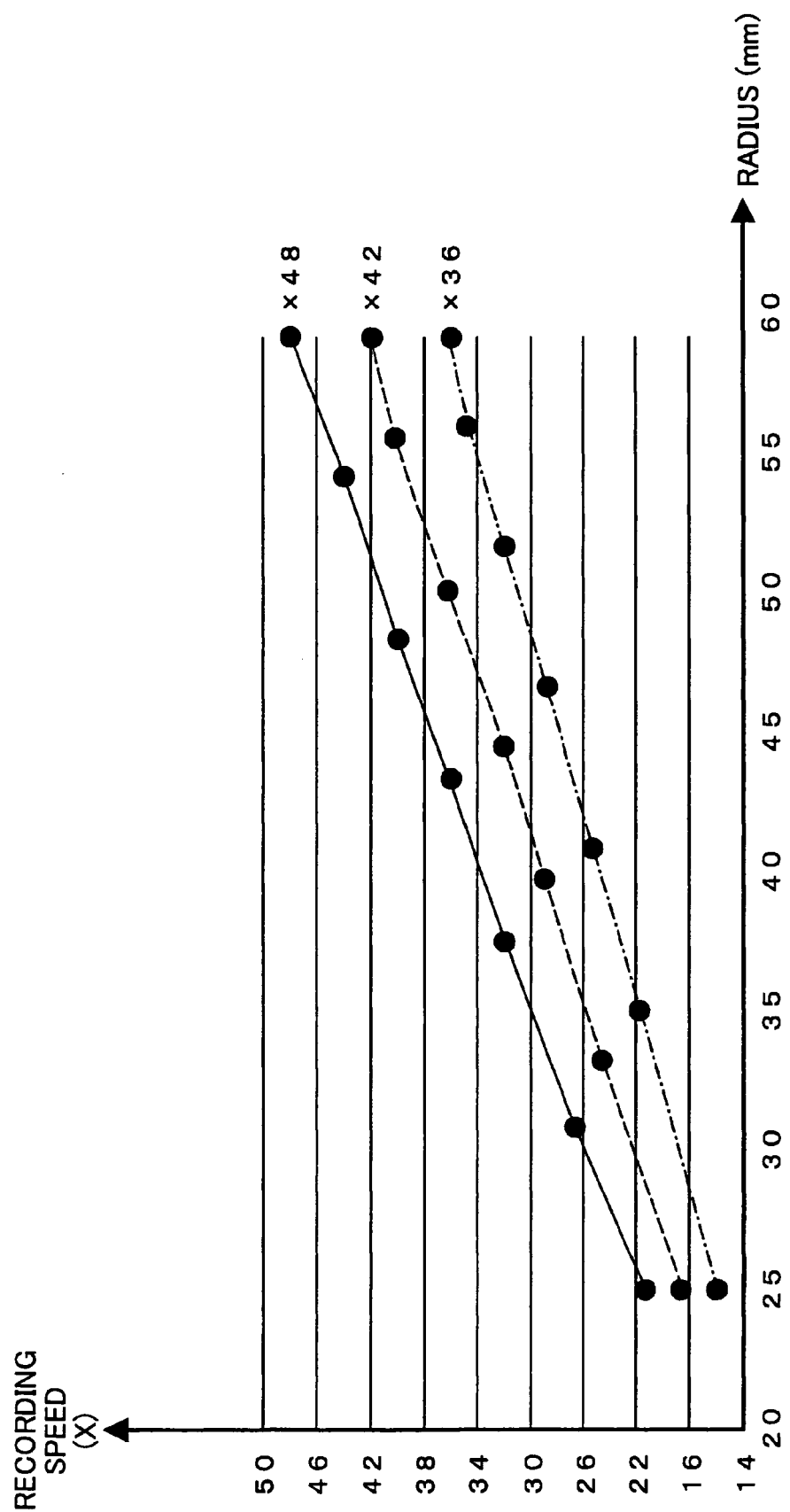
FIG. 6 is a graph showing variations of the recording speed with respect to the radius of the position on the optical disk.

FIG. 5 is a graph showing variations of the recording speed with respect to the absolute time on the optical disk 2. FIG. 6 is a graph showing variations of the recording speed with respect to the radius of the WPC position on the optical disk 2. In FIGS. 5 and 6, the symbol "○" represents a WPC position.

As shown in FIG. 5, the WPC positions for the recording speed of 42-speed are set to the positions that are shifted (delayed) for the predetermined time $\Delta T$ from the respective WPC positions for the recording speed of 48-speed. Also, the WPC positions for the recording speed 36-speed are set to the positions that are shifted (delayed) for the predetermined time $\Delta T$ from the WPC positions for the recording speed of 42-speed. In terms of radius of positions, the shifts are as those shown in FIG. 6.

Upon arrival at a position that is set in the WPC position table 25 during a recording operation, the microcomputer 24 performs the WPC processing.

Figure 7:
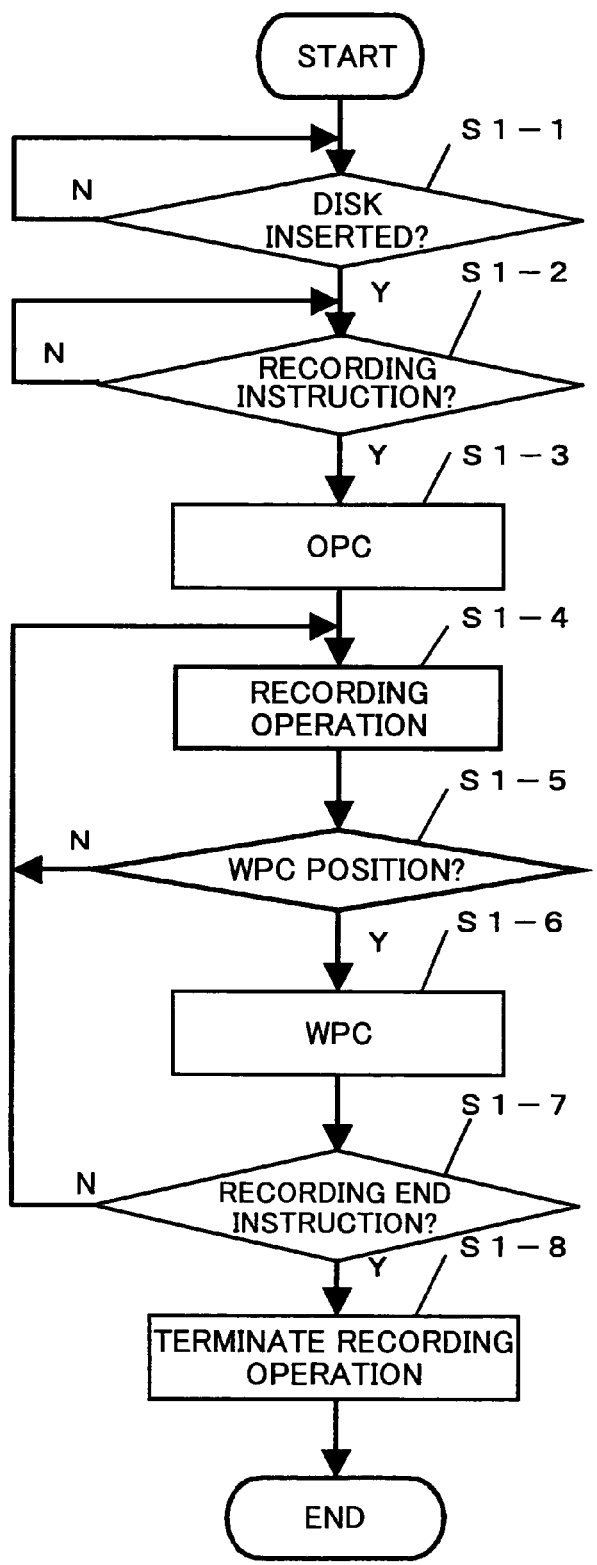
FIG. 7 is a flow chart for explaining the operation of a microcomputer at a recording operation.

FIG. 7 is a flow chart for explaining the operation of the microcomputer 24 at the time of the recording operation.

In step S1-1, whether the optical disk 2 is inserted is determined. Step S1-1 is repeated until the decision result in step S1-1 becomes YES. When the decision result in step S1-1 is YES, whether a recording instruction is given is determined in step S1-2. Step S1-2 is repeated until the decision result in step S1-2 becomes YES. When the decision result in step S1-2 is YES, the microcomputer 24 performs the OPC (optimum power control) processing in step S1-3. The OPC processing is performed by using a PCA (power calibration area) provided in the inner tracks of the optical disk 2.

In the OPC processing, as in conventional methods, a predetermined signal is recorded on the PCA at a predetermined recording speed while varying the recording power in 15 stages. Then, the signal recorded on the PCA is reproduced, and β values at respective recording powers are obtained from their peak values and bottom values according to the equation (1). In the OPC processing, the recording power at which the minimum β value is achieved among the obtained fifteen stages of β values is set to a register, which is incorporated in the microcomputer 24, as the optimum recording power. This process is performed for each recording speed, and the optimum recording power for each recording speed is obtained and set to the register incorporated in the microcomputer 24. In this manner, the OPC processing ends. It should be noted that the number of stages of the recording power in the OPC processing is not limited to 15, and may be broken into a greater number.

In step S1-4, the microcomputer 24 starts the recording operation. On this occasion, among the optimum recording powers obtained in the OPC processing of step S1-3, the microcomputer 24 performs the recording operation with the optimum recording power that is set in accordance with the recording speed. In step S1-5, it is determined whether a WPC position that is set in advance in the WPC position table 25 is reached. Step S1-5 is repeated until the decision result in step S1-5 becomes YES. When the decision result in step S1-5 is YES, the microcomputer 24 performs the WPC processing in step S1-6. On this occasion, the microcomputer 24 detects an absolute time included in a wobble signal that is extracted from the wobble, which is formed on the optical disk 2 in advance. The microcomputer 24 compares the detected absolute time with an absolute time set in the WPC position table 25, thereby determining whether the WPC position is reached.

The WPC processing is a process that obtains the optimum recording powers by obtaining the β values at the predetermined positions. The WPC processing is performed for correcting the optimum recording power at the predetermined positions, since the characteristics of the β values vary between the inner tracks and the outer tracks of the optical disk 2, and thus optimum recording cannot be performed in the outer tracks of the optical disk 2 with only the optimum recording power obtained in the OPC processing.

In step S1-7, it is determined whether a recording end instruction is given. Steps S1-4 through S1-6 are repeated until the recording end instruction is given (YES in step S1-7). When the decision result in step S1-7 is YES, the recording operation is terminated in step S1-8, and the process ends.

A detailed description will be given of the WPC processing.

Figure 8:
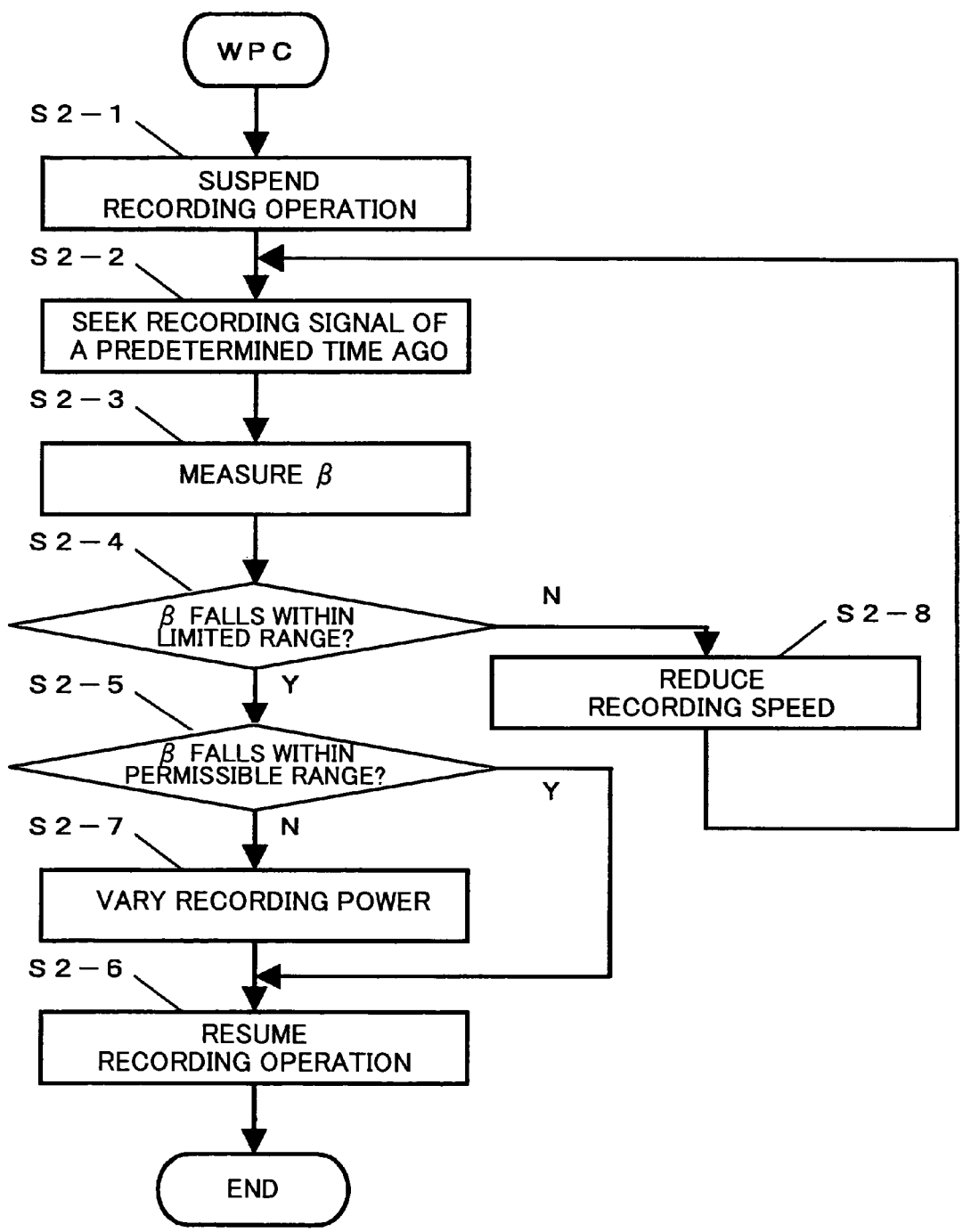
FIG. 8 is a flow chart for explaining WPC processing of the microcomputer.

FIG. 8 is a flow chart for explaining the operation of the microcomputer 24 at the time of the WPC processing.

When the WPC processing is started, first, the microcomputer 24 suspends the recording operation in step S2-1. Then, the microcomputer 24 seeks a recording signal of a predetermined time ago in step S2-2.

Figure 9:
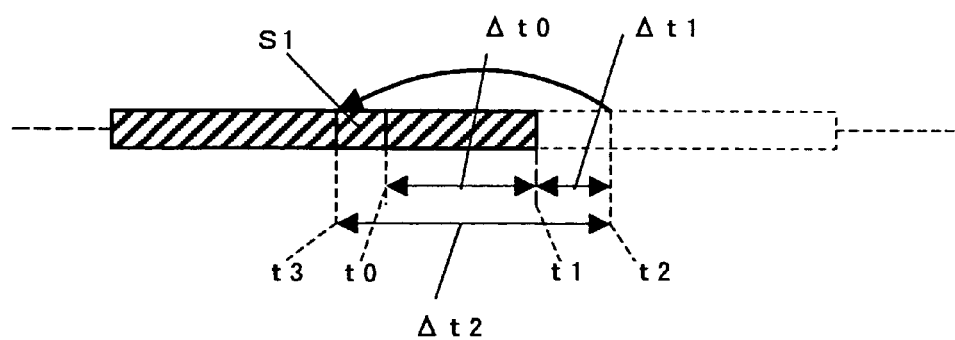
FIG. 9 is a schematic diagram for explaining the operation of the WPC processing.

FIG. 9 is a schematic diagram for explaining the WPC processing.

In FIG. 9, the WPC processing is started at a time t1, and the recording operation is suspended. At a time t2, after an operation waiting time Δt1 has elapsed since the time t1, a time t3 which is a time Δt2 before the time t2 is sought, and a signal S1, which is already recorded, is read. The recorded signal S1 is the signal recorded at a time t0 that is a time Δt0 before the time t1 at which the recording operation is suspended. In this manner, it is possible to read the recorded signal S1 after a duration of a predetermined time T=(Δt0+Δt1+Δt2). By setting the predetermined time T to about four seconds, it is possible to correspond to almost all optical disks. It should be noted that the predetermined time T is not limited to four seconds. The predetermined time T is set such that the time required for a characteristic value, i.e., a β value, to be stabilized elapses and the time required during which the β value can be obtained is kept to the minimum. In addition, the predetermined time T may be switched in accordance with the manufacturing corporation or the like of the optical disk 2.

In step S2-3, the microcomputer 24 obtains a β value by obtaining a peak value A1 and a bottom value A2 of the signal S1 that is recorded the predetermined time T ago. By obtaining the β value from the signal S1 of the predetermined time T ago, the β value is obtained after becoming stable. Thus, it is possible to obtain a correct β value. Hence, it is possible to accurately obtain an appropriate recording power.

On this occasion, by setting the recording time Δt0, the operation waiting time Δt1, and the seek time Δt2, to the minimums, it is possible to perform the WPC processing in a short time interval.

In step S2-4, the microcomputer 24 determines whether the β value falls within a limited range of recording power control.

When the β value falls within the limited range (YES in step S2-4), the microcomputer 24 determines whether the β value falls within a permissible range in step S2-5.

When the β value falls within the permissible range (YES in step S2-5), the microcomputer 24 resumes the recording operation in step S2-6 without varying the recording power. On the other hand, when the β value is outside the permissible range (NO in step S2-5), the recording power is varied in step S2-7 such that the β value becomes smaller. Thereafter, the recording operation is resumed in step S2-6.

When the β value is outside the limited range (NO in step S2-4), varying of the recording power alone is not sufficient. Thus, the microcomputer 24 reduces the recording speed for one step in step S2-8. When the recording speed is 24-speed, the recording speed is controlled to become 20-speed, for example. Then, the process returns to step S2-2, and the optimum recording power is obtained again at the reduced recording speed.

In this manner, it is always possible to record a signal at the optimum recording power.

In this embodiment, by reproducing the signal S1 that is recorded the predetermined time T ago, control of the recording power and the like is performed by obtaining the β value after the β value is stabilized. However, the β value may be obtained by reproducing the newest signal after waiting for a predetermined time.

Figure 10:
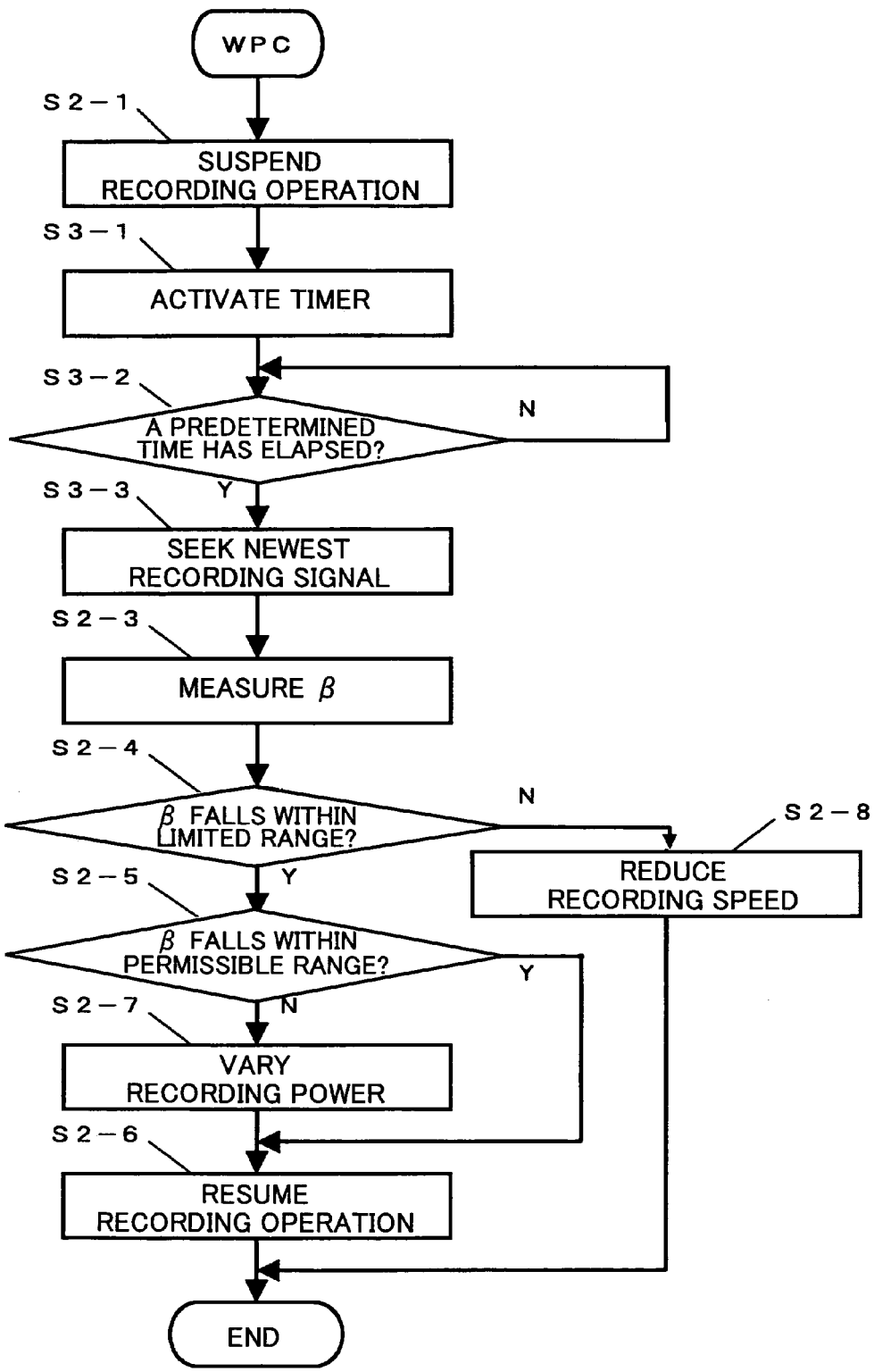
FIG. 10 is a flow chart for explaining a variation of the WPC processing of the microcomputer.

FIG. 10 is a flow chart for explaining a variation of the WPC processing of the microcomputer 24. In FIG. 10, those processes that are the same as those corresponding processes in FIG. 8 are designated by the same reference numerals, and a description thereof will be omitted.

In this variation, after suspending the recording operation in step S2-1, the microcomputer 24 activates a timer in step S3-1. In step S3-2, whether a predetermined time has passed is determined. Step S3-2 is repeated until the decision result in step S3-2 becomes YES. In other words, the microcomputer 24 waits until the predetermined time has elapsed (YES in step S3-2). When the predetermined time has elapsed (YES in step S3-2), the microcomputer 24 seeks the newest recording signal in step S3-3, and reads the peak value and the bottom value of the newest recording signal. In step S2-3, the microcomputer 24 measures the β value.

Figure 11:
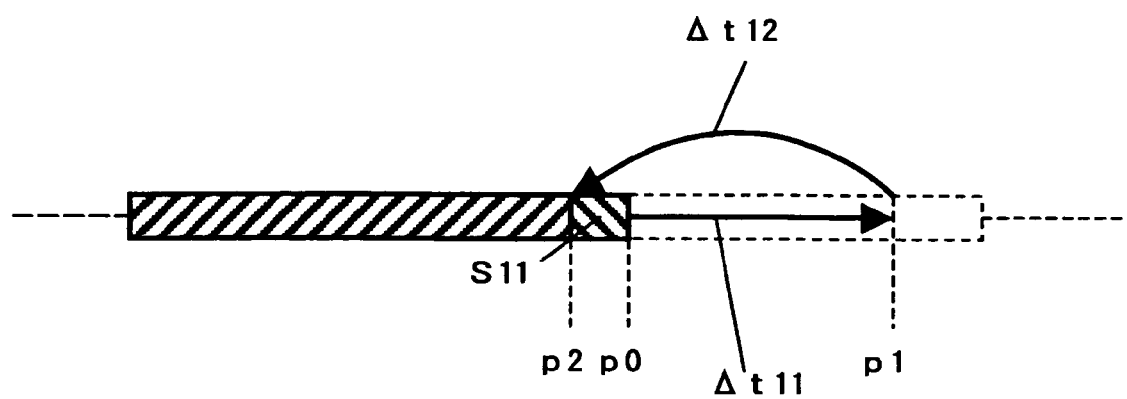
FIG. 11 is a schematic diagram for explaining the operation of the variation of the WPC processing.

FIG. 11 is a schematic diagram for explaining the operation of the variation of the WPC processing.

When the recording operation ends at a position p0, a position p2 of a newest signal S11 is sought from a position p1, which is a predetermined time Δt11 after the position p0. Thereby, the newest signal S11 is read, and the β value is measured from the peak value and the bottom value thereof.

On this occasion, by setting the predetermined time Δt11 in consideration of a seek time Δt12 that is required from the position p1 to the position p2, it is possible to read the newest signal S11 in the minimum time.

In the above-mentioned embodiment and variations, the description is given of the optical disk apparatus for recording signals on CD-Rs or CD-RWs. However, the present invention may also be applied to other optical disk apparatuses for recording signals on other recordable optical disks such as DVD-RAMs and MOs (magneto optical disks).

In addition, it is possible to apply the condition measuring method of the present invention to various recording methods, such as the CLV method, the CAV method, and the Zone CLV method.

As mentioned above, according to the present invention, the condition measuring positions for a recording speed are set to such positions that are shifted (delayed) for a predetermined time from the respective condition measuring positions that are set for a one level higher recording speed. Thereby, when the recording speed is reduced based on a condition measuring result at a condition measuring position of the one level higher level recording speed, it is possible to correct the recording power by immediately and accurately performing condition measuring at the reduced recording speed. Accordingly, it is possible to perform the recording operation with accuracy.

The present invention is not limited to the specifically disclosed embodiments, and variations and modifications may be made without departing from the scope of the present invention.

The present application is based on Japanese priority Application No. 2002-372425 filed on Dec. 24, 2002, the entire contents of which are hereby incorporated by reference.

What is claimed is:

1. An optical disk apparatus capable of recording a signal on an optical disk by directing an optical beam thereon at a plurality of recording speeds which are different from each other at the same radius, said apparatus comprising:
a condition measuring position storing part that stores condition measuring positions at which a condition of the signal is measured for each of the recording speeds; and
a signal condition measuring part that measures the condition of the signal, which condition of the signal is used for write power compensation, by suspending a recording operation at the condition measuring positions stored in said condition measuring position storing part, wherein, in said condition measuring position storing part, the condition measuring positions for a recording speed whose level is one level lower than a level of a predetermined recording speed are set to positions shifted for a predetermined time from respective corresponding condition measuring positions for the predetermined recording speed, and said optical disk apparatus is configured to perform WPC, said WPC being carried out during recording by interrupting recording at a predetermined position, verifying the condition measured by the signal condition measuring part, correcting the recording power or reducing the recording speed in accordance with the status of the verified recording condition, and then restarting recording,
wherein verifying the condition measured by the signal condition measuring part comprises:
obtaining a peak value and a minimum value of the signal recorded at a time before the predetermined position of interrupting the signal;
utilizing the peak value and the minimum value to determine whether the recording power of the signal recorded a predetermined time before the position of interrupting the recording operation is within a predetermined range.

2. The optical disk apparatus as claimed in claim 1, wherein the predetermined time is set to a time interval from when the predetermined recording speed is changed to the lower level recording speed until the recording operation is stabilized after the recording operation is resumed at the lower level recording speed.

3. The optical disk apparatus as claimed in claim 2, wherein the predetermined time is set to two minutes in absolute time that is set to the optical disk in advance.

4. A condition measuring method of measuring a condition of a signal recorded on an optical disk by an optical disk apparatus capable of recording the signal on the optical disk by directing an optical beam thereon at a plurality of recording speeds which are different from each other at the same radius, said method comprising the steps of:
setting second condition measuring positions for a second recording speed whose level is one level lower than a level of a predetermined recording speed to positions that are shifted for a predetermined time from first condition measuring positions for the predetermined recording speed; and
measuring the condition of the signal, which condition of the signal is used for write power compensation, by suspending a recording operation at the first and the second condition measuring positions at the predetermined recording speed and the second recording speed, respectively, and verifying the measured condition by obtaining a peak value and a minimum value of the signal recorded at a time before the position of suspending the recording operation and utilizing the peak value and the minimum value to determine whether a recording power of the signal recorded a second predetermined time before the position of suspending the recording operation is within a predetermined range.

5. The condition measuring method as claimed in claim 4, wherein the predetermined time is a time interval from when the predetermined recording speed is changed to the second recording speed until the recording operation is stabilized after the recording operation is resumed at the second recording speed.

6. The condition measuring method as claimed in claim 5, wherein the predetermined time is set to two minutes in absolute time that is set to the optical disk in advance.

* * * * *